United States Patent
Hayamizu et al.

(10) Patent No.: US 7,209,985 B2
(45) Date of Patent: Apr. 24, 2007

(54) INPUT INFORMATION PROCESSING APPARATUS, METHOD AND PROGRAM

(75) Inventors: Makoto Hayamizu, Maebashi (JP); Atsushi Kobayashi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 442 days.

(21) Appl. No.: 10/777,134

(22) Filed: Feb. 13, 2004

(65) Prior Publication Data

US 2004/0199685 A1 Oct. 7, 2004

(30) Foreign Application Priority Data

Mar. 14, 2003 (JP) .............................. 2003-069730

(51) Int. Cl.
*G06F 13/00* (2006.01)
(52) U.S. Cl. ...................... 710/67; 710/73; 710/21; 345/168; 345/173; 345/594; 708/139
(58) Field of Classification Search ............ 710/15–21, 710/62–74, 316–317; 345/156–184, 594; 708/139–146
See application file for complete search history.

(56) References Cited

U.S. PATENT DOCUMENTS

| | | | | |
|---|---|---|---|---|
| 4,587,630 A | * | 5/1986 | Straton et al. ............... 715/823 |
| 5,297,031 A | * | 3/1994 | Gutterman et al. ............ 705/37 |
| 5,576,706 A | * | 11/1996 | Daigle et al. .................. 341/22 |
| 5,724,069 A | * | 3/1998 | Chen ........................... 345/172 |
| 5,818,451 A | * | 10/1998 | Bertram et al. .............. 715/840 |
| 5,936,614 A | * | 8/1999 | An et al. ...................... 345/173 |
| 6,121,960 A | * | 9/2000 | Carroll et al. ................ 345/173 |
| 6,491,630 B1 | * | 12/2002 | Saccardo et al. ............ 600/437 |
| 2004/0243314 A1 | * | 12/2004 | Cohen et al. ................. 702/19 |

FOREIGN PATENT DOCUMENTS

| | | |
|---|---|---|
| JP | 05-143859 | 6/1993 |
| JP | 09-319490 | 12/1997 |
| JP | 2003-022151 | 1/2003 |

\* cited by examiner

*Primary Examiner*—Christopher Shin
(74) *Attorney, Agent, or Firm*—Arent Fox LLP

(57) ABSTRACT

There are provided, on the POS device unit side, a physical keyboard having a plurality of physical keys arranged thereon; a screen keyboard comprising a plurality of screen keys arranged and displayed on a screen having a touch panel arranged thereon adjacent the physical keyboard; and a key data transfer control unit which connects each of the physical keyboard and the screen keyboard to an input port, and transfers key data from an output port in accordance with the sequence of key operations of the physical keyboard and the screen keyboard. A keyboard control unit which notifies the key data transferred from the key data transfer control unit to the application processing unit for execution of processing is provided in the POS main body. When physical keys and screen keys are operated in succession, the key data are transferred in the sequence of key operations and notified to the application.

16 Claims, 17 Drawing Sheets

| SALES | | |
|---|---|---|
| NOV. 25, 2002 (MONDAY) 08:13 | | |
| BASIC SCREEN | ASPARAGUS A BUNDLE | RADISH ONE |
| | SOYBEANS A NET | ONION ONE |
| RAW FISH DRIED FISH | TURNIP A BUNDLE | CORN A TWIG |
| DRESSED MEAT | CABBAGE ONE | TOMATO ONE |
| CROQUETTE, DEEP-FRIED FOOD | CUCUMBER ONE | EGGPLANT ONE |
| | CUCUMBER A BAG | EGGPLANT A BAG |
| | SWEET POTATO ONE | GREEN ONION A BUNDLE |
| | POTATO ONE | GREEN ONION ONE |
| | CELERY A BUNDLE | ONION ONE |

FIG. 3B

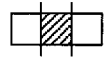

| SPIT-ROASTED EEL, SOLD LOOSE | | | ¥300 |
| --- | --- | --- | --- |
| PLEASE REGISTER GOODS. | | | |
| TOTAL : 1 ITEM | | | ¥315 |
| RAW MUSHROOM A NET | IYOKAN ONE | APPLE ONE | ROAST CHICKEN BUFFET-STYLE FLAT RATE OF 88 |
| CARROT ONE | IYOKAN A NET | LEMON ONE | SUSHI BUFFET-STYLE |
| GINGER A BUNDLE | ORANGE ONE | SPIT-ROASTED EEL SOLD LOOSE | HOUSEHOLD DISH SATSUMA-AGE |
| GREEN PEPPER ONE | KAKI ONE | FULL-LENGTH -ROASTED EEL | HOUSEHOLD DISH ROASTED CHICKEN |
| GREEN PEPPER A BAG | KIWI FRUIT ONE | SHRIMP SOLD LOOSE | CHICKEN ROLL |
| BROCCOLI A ROOT | GRAPEFRUIT ONE | SLICED SALMON SOLD LOOSE | CHINESE SPRING ROLL BUFFET-STYLE |
| SPINACH A BUNDLE | PEAR ONE | RAW SQUID | FRIED CHICKEN |
| LETTUCE ONE | MANDARIN SOLD LOOSE | RAW SAURY SOLD LOOSE | FRIED LEG |
|  | PEACH ONE |  | ROASTED LEG |

FIG. 3C

| CHICKEN BROILED WITH SOY SAUCE | CONGER TEMPURA | ODEN MATERIALS SOLD LOOSE ¥30 | CHEAP CAKE ¥10 |
|---|---|---|---|
| SPIT-ROASTED CUTLET | SQUID'S LEGS TEMPURA | EGGS SOLD LOOSE | CHEAP CAKE ¥20 |
| CHICKEN CUTLET | SQUID TEMPURA | DAILY CHINESE BUN SOLD LOOSE | CHEAP CAKE ¥30 |
| FILLET CUTLET | SHRIMP TEMPURA | DAILY ¥98 CAKE SOLD LOOSE | FLOORCLOTH ¥30 |
| FRIED CAKE OF MINCED MEAT | VEGETABLE MIXTURE TEMPURA | MINAKAMI COTTON-FILTERED TOFU | FLOORCLOTH WITH STRING ¥30 |
| PORK LOIN CUTLET | CHIKUWA TEMPURA | MINAKAMI TOFU MIXTURE | |
| FRIED HORSE MACKEREL | BEGETABLE TEMPURA | JAPANESE CAKE SOLD LOOSE FLAT RATE OF 68 | |
| FRIED PRAWNS | | | |
| SPIT-FRIED PORK | | | |

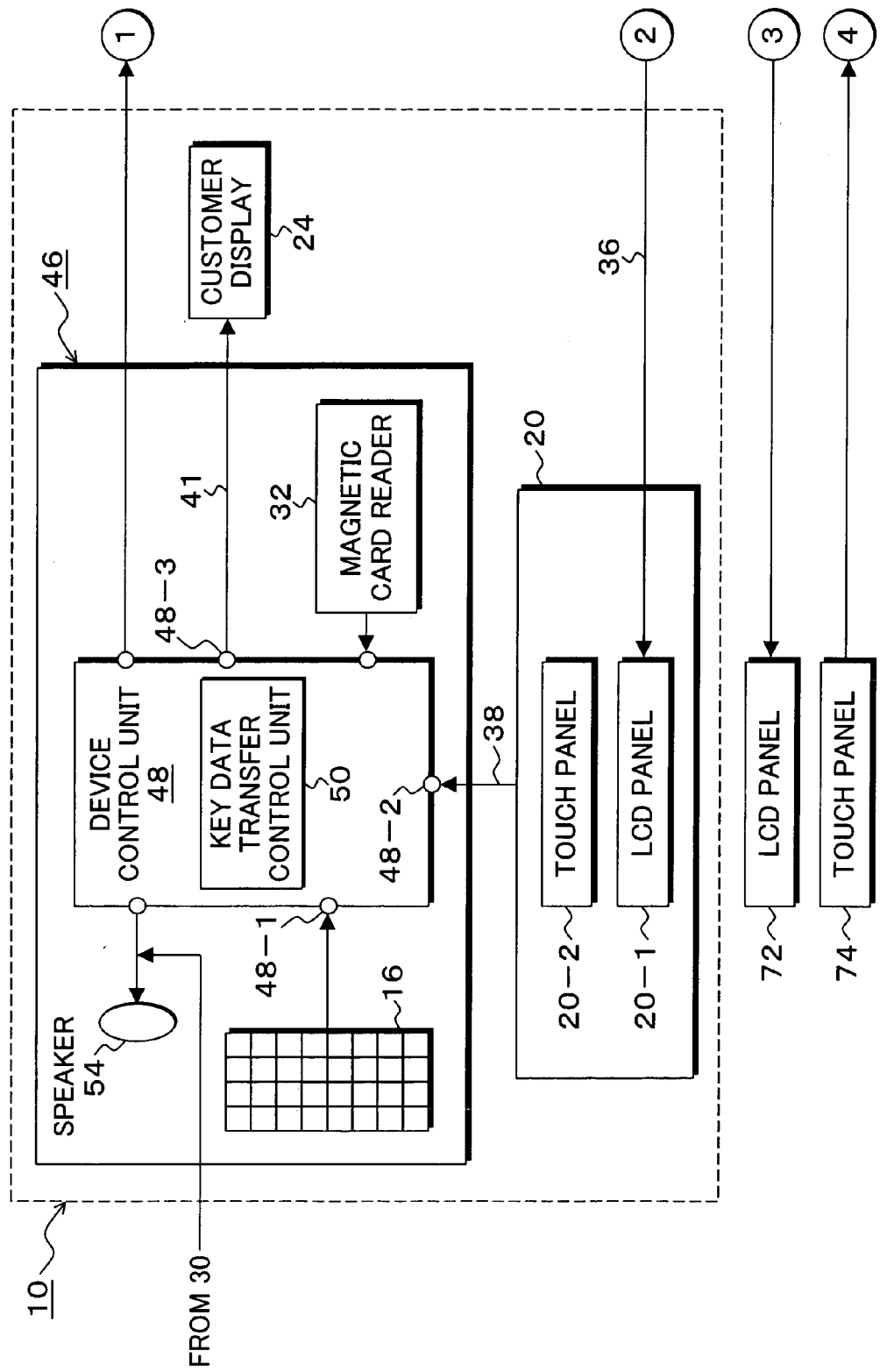

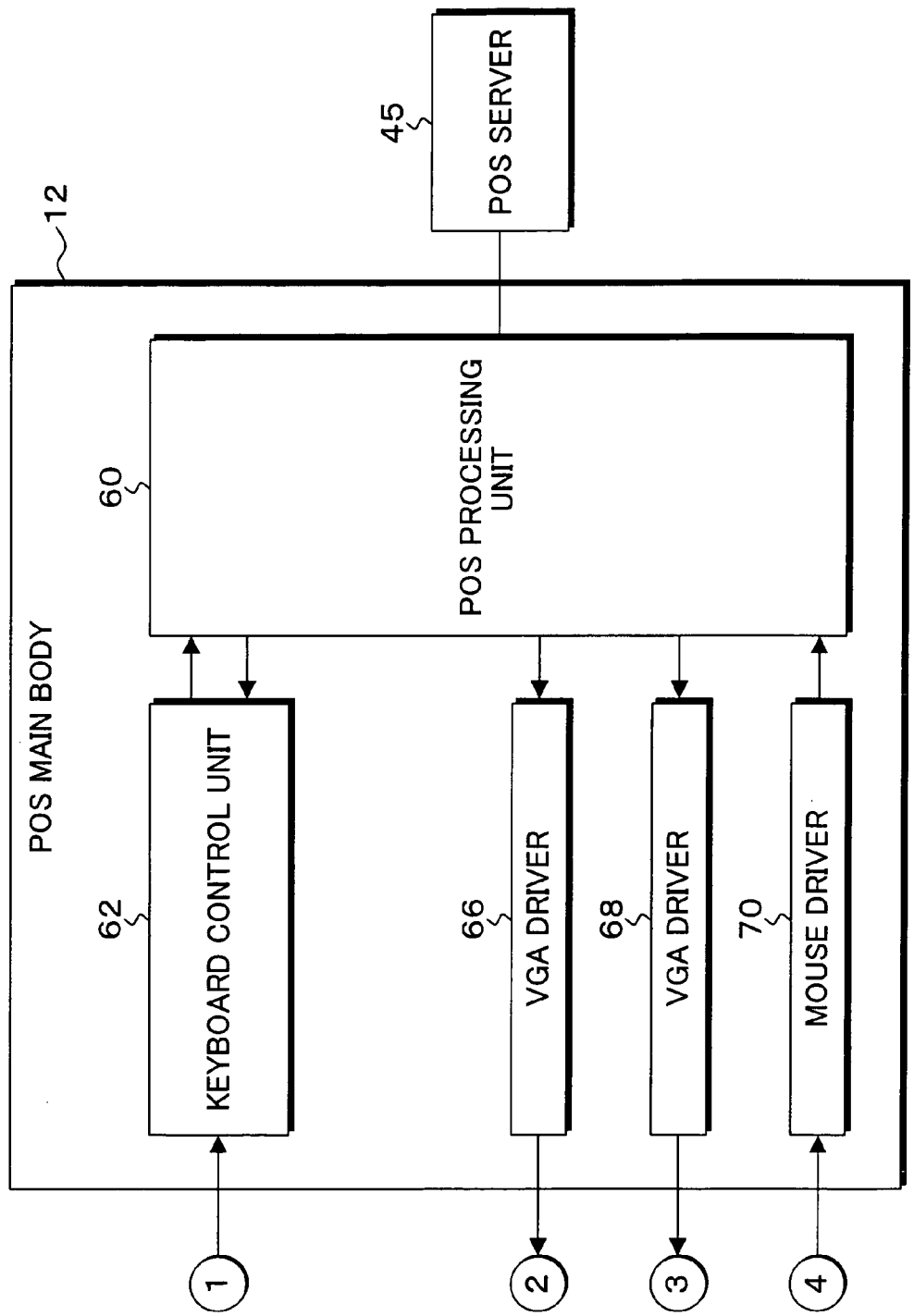

SCREEN KEY

TRANSFERRED DATA

PHYSICAL KEY

SCREEN KEY

TRANSFERRED DATA

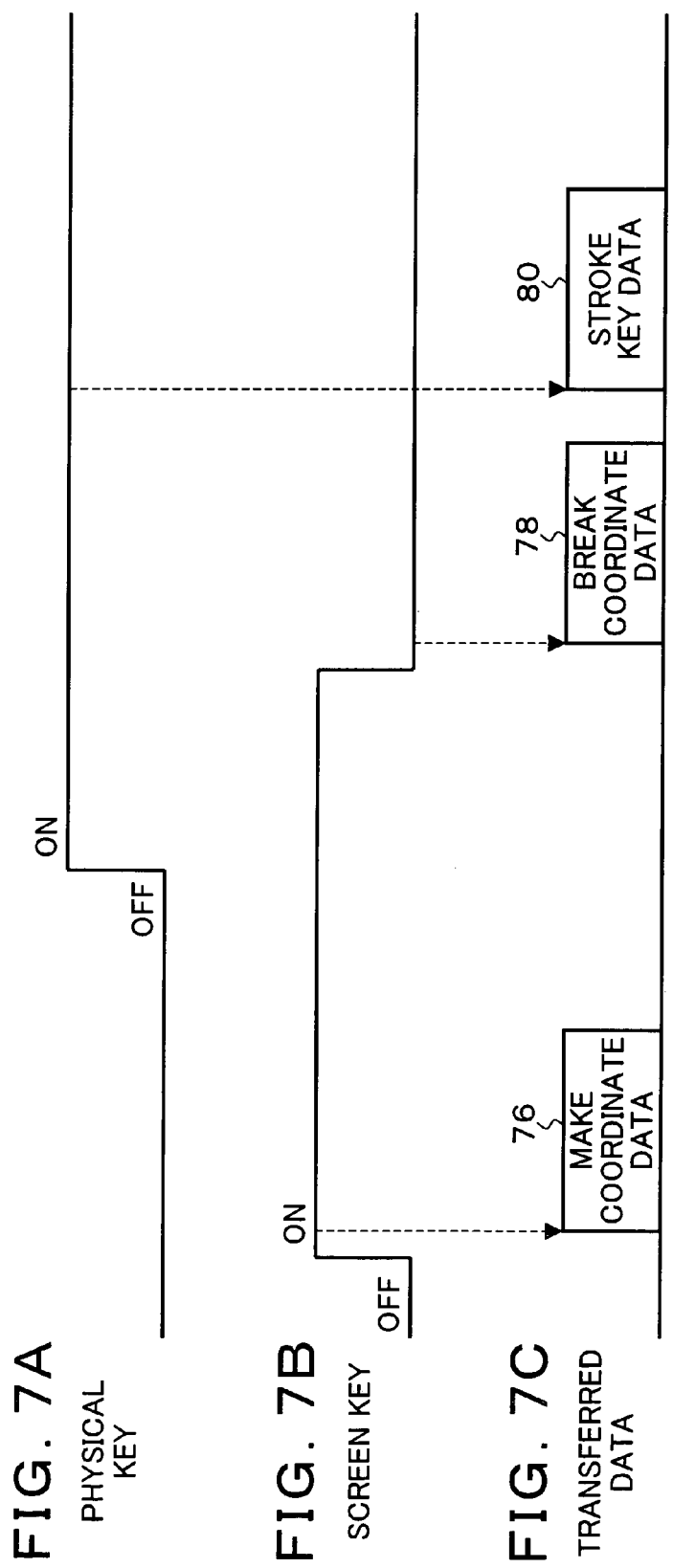

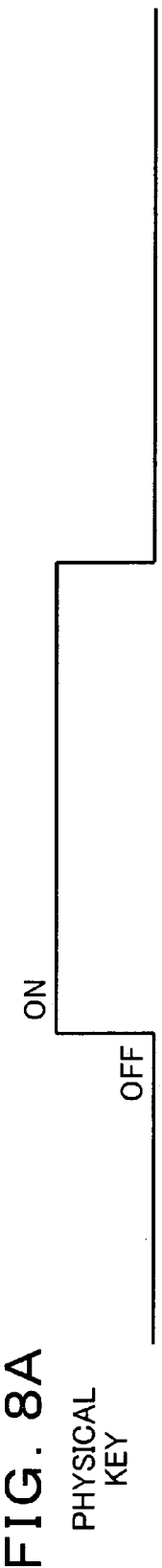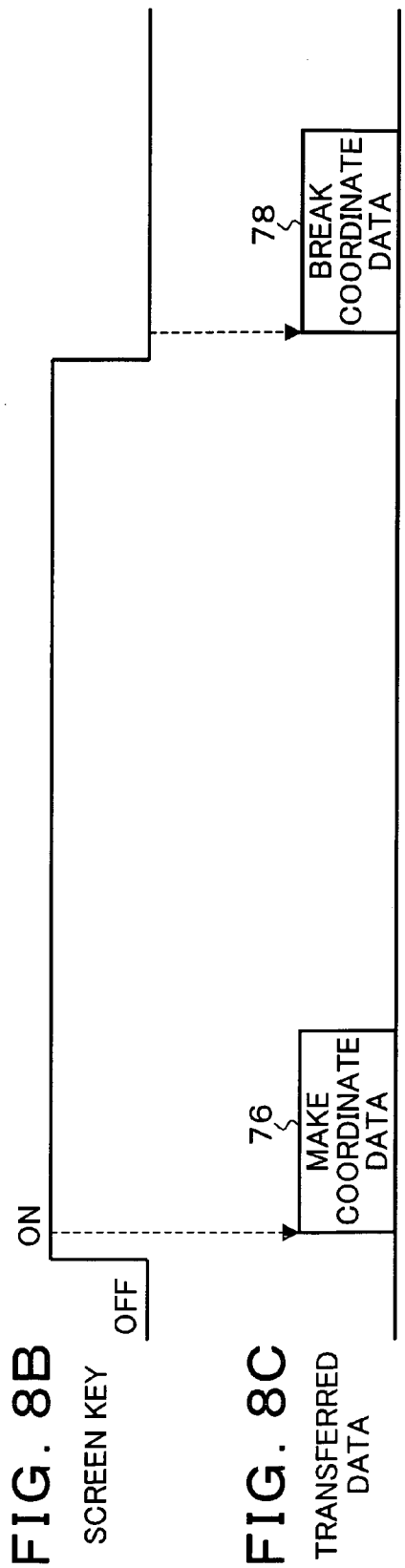
FIG. 8A
PHYSICAL KEY
FIG. 8B
SCREEN KEY
FIG. 8C
TRANSFERRED DATA

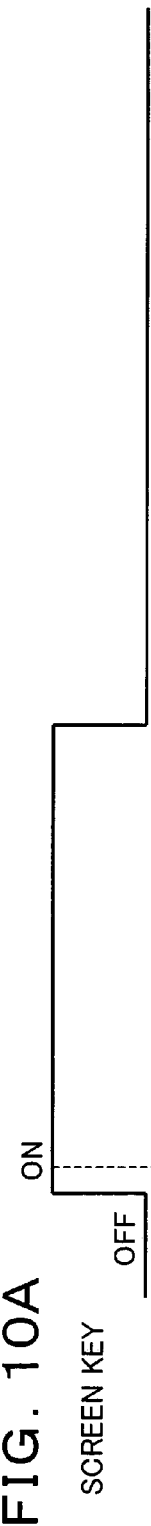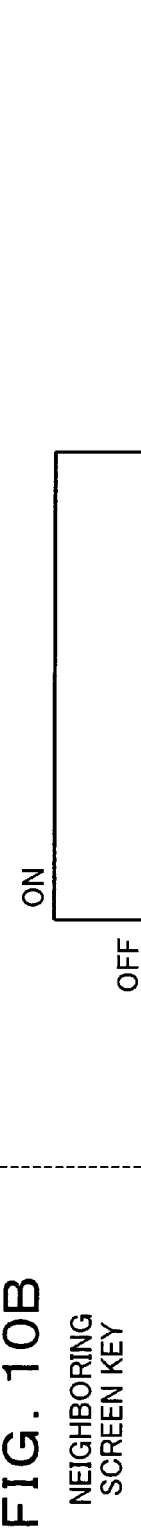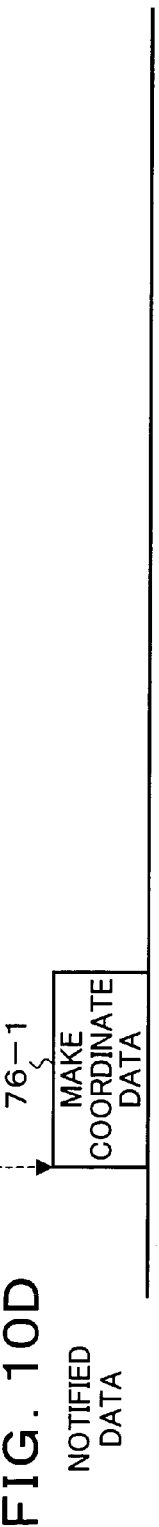

INPUT INFORMATION PROCESSING APPARATUS, METHOD AND PROGRAM

BACKGROUND OF THE INVENTION

1. Field of the Invention

The present invention relates to an input information processing apparatus for processing input information entered from a keyboard used in a POS system, a method therefore, and a program therefore. More particularly, the present invention relates to an input information processing apparatus for processing a device input entered from a physical keyboard and a screen keyboard based on a touch panel, a method therefore and a program therefore.

2. Description of the Related Art

In a conventional POS system used in a supermarket or the like, a POS device unit having a barcode reading scanner, a card reader, an LCD, a keyboard and the like is separately arranged on a product checkout lane from a POS main body having a cash register. The POS device unit arranged on the checkout lane reads out product barcodes through the scanner, enters the number of goods with ten-keys and subjects the input to a calculation processing. When a product barcode reader is not provided, a unit price is derived by operating the screen keys, and the number of goods is entered through the ten-keys for calculation processing. In the conventional POS system as described above, the POS main body corresponds to the personal computer, to which individual devices of the device unit are cable-connected. The ten-keys are connected via the sasme device interface as the keyboard of the personal computer, and for the screen keyboard, it is connected via a mouse interface having a transfer rate higher than that of a keyboard.

In the conventional POS system as described above, however, the interface for the physical keyboard such as ten-keys and the interface for the screen keyboard comprising a touch panel provided on the LCD are separately provided, with furthermore different transfer rates. This causes a problem in that, when the physical keys and the screen keys are pressed in succession, notifications to the application are changed over in sequence. When managing the system by assigning numeral keys or multiplication key to the physical keyboard, and products to the screen keys, and a shopping basket contains three identical products, the operator operates keys in sequence of "3", "×", and then the "product key". In this case, the route of the keyboard interface transmitting the key operation of the physical keys "3" and "×" is different from the route of the mouse interface communicating the operation of the screen key "product key". Since the mouse interface has a higher transfer rate, a successive and rapid key operation may sometimes result in earlier arrival of the screen key at the application. For example, when entering three cucumbers and one Japanese radish, keys are pressed in a sequence of "3", "×", "cucumber" and "radish". When entering a single piece of product, "1" and "×" can be omitted. In this case, input of the screen key "cucumber" may be notified earlier to the application than the physical keys "3" and "×", resulting in a sequence of "cucumber", "3", "×", and then "radish", leading to a sale of a single cucumber and three radish. In order to avoid an error in which a changed-over sequence of key operations is notified to the application, it is inevitable to slowly conduct successive key operations, this in turn causing a problem of operability.

Operation of the screen keyboard is transmitted to the application by the mouse interface upon pressing and then releasing the key. The response from the application to the key operation is therefore felt dull.

A click sound is given for a key operation to beat rhythm. When alternately operating the physical and screen keys by causing the both interfaces to have the same transfer rate, response sounds for the individual key operations are ill-timed, this leading to a problem of a more difficult operation resulting from the ill-timed tempo. Furthermore, when the finger is shifted while being in touch with the screen keyboard, the key data of the key from which the finger is released is notified to the application, as if the screen key at the shift position were pressed, thus causing a problem in that a malfunction occurs for a quick operation of the screen keyboard.

SUMMARY OF THE INVENTION

According to the present invention, there are provided an input information processing apparatus in which successive operation of the physical keys and the screen keys does not cause changeover of the sequence, and shifting of a finger while being in contact with the screen keyboard does not cause a malfunction, a method therefore and a program therefore.

The present invention provides an input information processing apparatus. This input information processing apparatus comprises a physical keyboard which has a plurality of physical keys and generates key data through operation of the physical keys; a screen keyboard which comprises a plurality of screen keys arranged and displayed on a screen having a touch panel arranged thereon, and generates key data through operation of the screen keys; an input port to which the physical keyboard and the screen keyboard are connected; an output port for transferring the key data; an application processing unit which performs prescribed processing in accordance with the transferred key data; a key data transfer control unit which transfers the key data entered from the input port through key operation on the physical keyboard and the key data from the input port through operation on the screen keyboard in accordance with an operating sequence for these keyboards via the output port; and a keyboard control unit which notifies the application processing unit of the key data transferred from the key data transfer control unit for causing to execute processing.

In the present invention, as described above, when successively operating the physical keys and the screen keys, by connecting the physical keyboard and the screen keyboard for input to the key data transfer control unit via the respective input ports to transfer the key data through a single interface from one output port to the keyboard control unit, the key data is always transferred in the operating sequence of the keys to communicate the data to the application. The sequence for notification to the application is never changed over.

In the above-mentioned input information processor, the key data transfer control unit transfers key stroke data for each pressing stroke of the physical key when the physical keys are operated in succession; and transfers make coordinate data for each pressing stroke of the screen key, and transfers break coordinate data for each releasing stroke of the screen key when the screen keys are operated in succession.

In the above-mentioned input information processor, when successively operating the physical keys and then the screen keys in duplication, the key data transfer control unit transfers key stroke data upon pressing a physical key, then transfers make coordinate data upon pressing a screen key, and then transfers break coordinate data upon releasing the screen key.

In the above-mentioned input information processing apparatus, when successively operating the screen keys and then the physical keys in duplication, the key data transfer unit transfers make coordinate data upon pressing a screen key, inhibits transfer of key stroke data upon pressing a physical key while pressing a screen key transfers break coordinate data upon releasing the screen key, and when pressing of the physical key is continued after releasing the screen key, transfers key stroke data in succession to the transfer of the break coordinate data. Even when a physical key is pressed down while pressing a screen key as described above, the stroke key data of the physical key cannot be transferred under suppression, and as a result, after sending the break coordinate data by releasing the screen key, to transfer the key stroke data by canceling the suppression. Even when a notification to the application is accomplished upon releasing the screen key, the sequence of key operations notified to the application is never changed over.

In the above-mentioned input information processing apparatus, the keyboard control unit notifies the key data upon pressing the key from among the key data received from the key data transfer unit to the application processing unit for execution of processing, and suppresses notification of the key data upon releasing the key. More specifically, the keyboard control unit notifies the make coordinate data upon pressing the screen key from among the key data received from the key data transfer unit to the application processing unit to cause execution of the processing, and suppresses notification of the break coordinate data upon releasing the screen key. As a result, even when the finger in touch with the screen keyboard is shifted, only the key data of the screen key with which the finger has been in touch first is notified to the application, thus preventing a malfunction of recognizing the key operation as that for the shifted position.

Prevention of a malfunction susceptible upon shifting of the finger in touch with the screen keyboard may be accomplished on the key data transfer control unit side. That is, the key data transfer control unit transfers key data upon pressing a key in response to key operation, and suppresses transfer of key data upon releasing the key. More specifically, the key data transfer control unit transfers make coordinate data upon pressing a screen key in response to key operation, and suppresses transfer of break coordinate data upon releasing the screen key.

In the input information processor of the present invention, the physical keyboard, and the screen keyboard and the key device transfer control unit are provided in the POS device unit, together with a scanner unit which reads product barcodes, and the keyboard control unit and the application processing unit are provided in a POS main body having a card register.

The present invention provides an input information processing method. This input information processing method comprises:

A first event detecting step of detecting an event caused by operation of a physical key from the signal status of an input port connected to a physical keyboard which has a plurality of physical keys and generates key data through key operation to the physical keys;

A second event detecting step of detecting an event caused by operation of a screen key from the signal status of the input port connected to the screen keyboard which displays a plurality of screen keys on a screen comprising touch panels and generating key data through key operation to the screen keys; and A key data transfer controlling step of transferring key data entered from the input port through key operation on the physical keyboard and key data entered from the input port through key operation on the screen keyboard in accordance with an operation sequence for the both keyboards via an output port.

The input information processing method further comprises a keyboard controlling step of notifying key data transferred in the key data transfer controlling step for execution.

In the above-mentioned input information processing method, the keyboard controlling step is to notify key data upon pressing the key from among the key data transferred in the key data step to the application for execution, and suppresses notification of the key data upon releasing the key.

In the above-mentioned input information processing method, the key data transfer controlling step may be to transfer the key data upon detecting a key pressing event for a key operation, and suppress key data transfer upon detecting a key releasing event.

The present invention provides a program executed by a computer composing a device control unit. The program causes the computer composing the device control unit to execute:

A first event detecting step of detecting an event caused by operation of a physical key from the signal status of an input port connected to a physical keyboard which has a plurality of physical keys and generating key data through key operation to the physical keys;

A second event detecting step of detecting an event caused by operation of a screen key from the signal status of the input port connected to the screen keyboard which displays a plurality of screen keys on a screen comprising a touch panel and generating key data through key operation to the screen keys; and A key data transfer controlling step of transferring key data entered from the input port through key operation on the physical keyboard and key data entered from the input port through key operation on the screen keyboard in accordance with an operation sequence for the both keyboards via an output port.

In the above-mentioned program, the key data transfer controlling step is to transfer the key data upon detecting a key pressing event for a key operation, and suppress key data transfer upon detecting a key releasing event.

The above and other objects, features, and advantages of the present invention will become more apparent from the following detailed description with reference to the drawings.

BRIEF DESCRIPTION OF THE DRAWINGS

FIGS. 3A to 3C are descriptive views of a typical example of the screen keyboard;

FIGS. 4A and 4B are block diagrams of the functional configuration representing an embodiment of the present invention;

FIGS. 7A to 7C are time charts of transferred data when operating a physical key after a screen key;

FIGS. 8A to 8C are time charts of transferred data when operating a physical key during a period from pressing to releasing of a screen key;

FIGS. 10A to 10D time charts when presenting a malfunction caused by transferred data received upon shift of a finger in contact with the screen keyboard by the keyboard control unit of the POS main body;

DETAILED DESCRIPTION OF THE PREFERRED EMBODIMENTS

Figure 1:
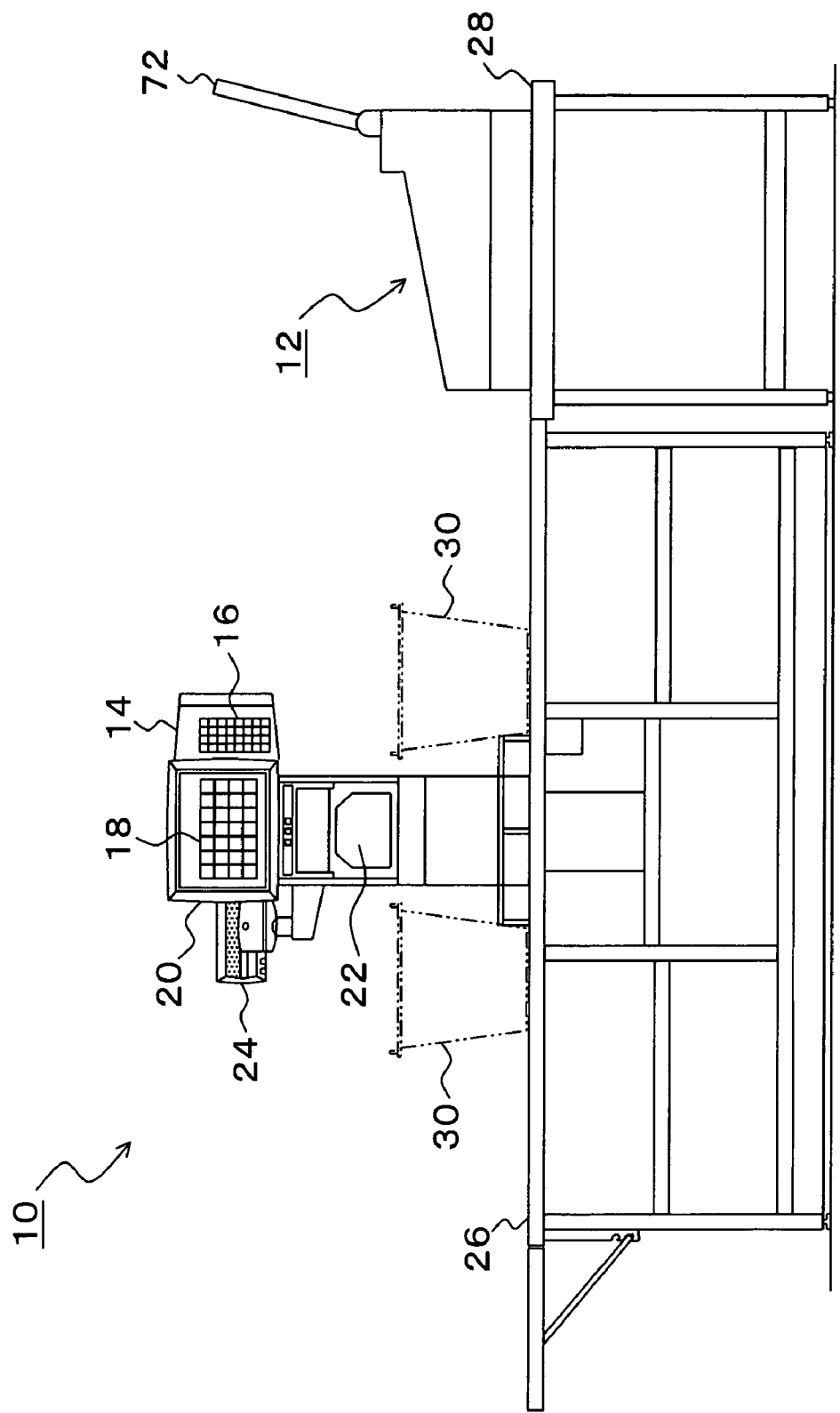
FIG. 1 is a descriptive view of a POS system to which the present invention is applied.

FIG. 1 is a descriptive view of a POS system to which the present invention is applied. In FIG. 1, the POS system comprises a POS device unit 10 and a POS main body 12. The POS device unit 10 has an electronic multi-item keyboard 14, a scanner unit 22 and a customer display 24. The electronic multi-item keyboard 14 comprises a physical keyboard 16 using 4×8 ten-keys and a screen keyboard 18 achieved by an LCD unit 20 formed by a touch panel arranged on the screen. The POS device unit 10 as described above is installed on a desk 26 arranged on a checkout lane, and carries out read operation of a barcode by means of the scanner unit 22 by taking out goods in a shopping basket 30 or input operation using the screen keyboard 18 and the physical keyboard 16 of the electronic multi-item keyboard 14. The POS main body 12 has a cash register which is placed on a desk 28 for the operator to conduct settlement work of goods in accordance with the input information from the POS device unit 10. In this POS system, processing is usually performed by two operators, one for the POS device unit 10, and the other for the POS main body 12.

Figure 2:
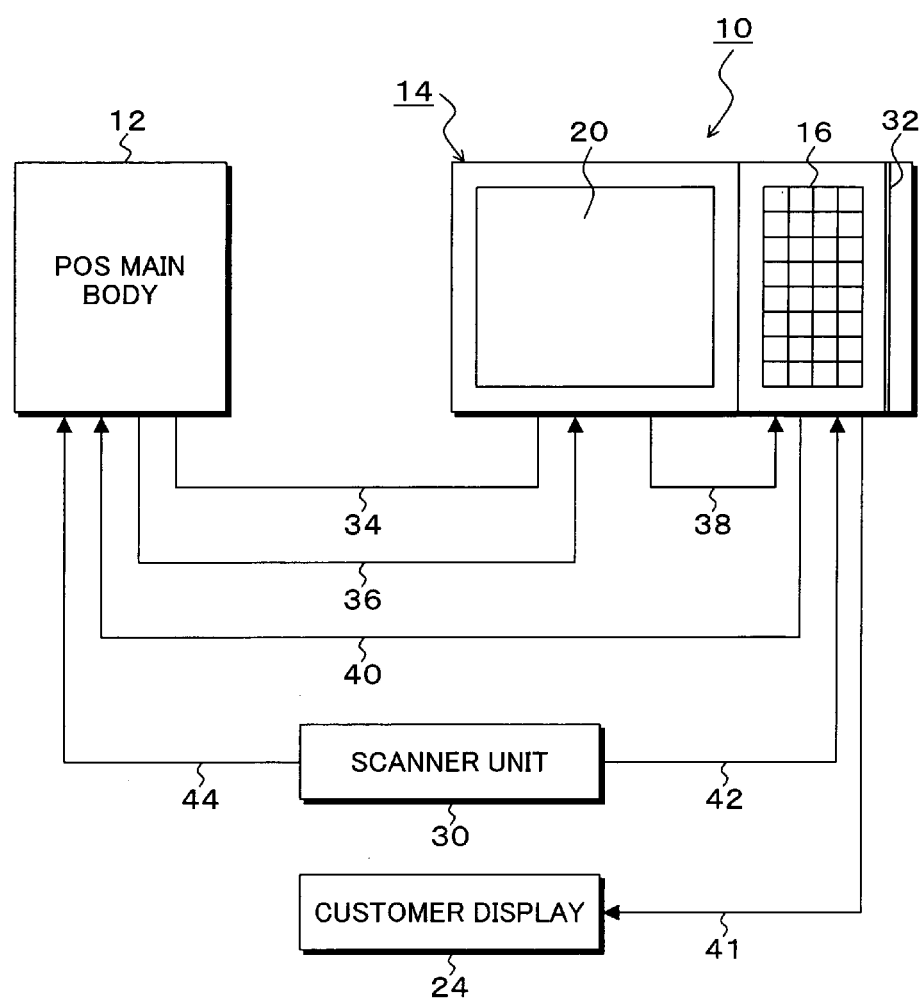
FIG. 2 is a descriptive view of the hardware configuration of the POS system shown in FIG. 1.

FIG. 2 is a descriptive view of the hardware configuration of the POS system shown in FIG. 1. In FIG. 2, an LCD power cable 34 from the POS main body is connected to an LCD unit 20 of the electronic multi-item keyboard 14, and an LCD cable 36 for displaying a screen for the LCD unit 20. A touch panel is arranged on the screen of the LCD unit 20, and a touch panel cable 38 from this touch panel is connected to the physical keyboard 16 side. A magnetic card reader 32 is formed to the right of the physical keyboard 16. A keyboard cable 40 connects the physical keyboard 16 and the POS main body 12. In the present invention, as described above, a signal from the touch panel provided in the LCD unit 20 is sent by the touch panel cable 38 to the physical keyboard 16 side, and synthesized with a key operating signal on the physical keyboard 16 side. Signals from the screen keyboard and those from the physical keyboard are sent to the POS main body 12 through keyboard cables 40 having the same sequence as that of key operations. A scanner cable 44 connects the scanner unit 30 to the POS main body 12, and a speaker cable 42 connects the scanner unit 30 to the electronic multi-item keyboard 14. This speaker cable 42 causes a speaker built in the electronic multi-item keyboard 14 to issue click sound through read of the barcode in the scanner unit 30. The electronic multi-item keyboard 14 is connected to a customer display 224 via a display cable 41. The physical keyboard 16 provided on the electronic multi-item keyboard 14 has 4×8 ten-keys. The numerals 0 to 9, mathematical signs such as "×", "−" and "%", and predetermined function keys are assigned to the individual keys.

Figure 3A:

FIGS. 3A to 3C illustrate concrete a example of the screen keyboard 18 displayed on the LCD unit 20 shown in FIG. 1. This screen keyboard 18 displays, for example, 9×10 screen keys lengthwise and breadthwise, and each screen key represents a product name. The screen can be switched over by use of keys arranged longitudinally to the left of the screen keyboard 18 in units of 9×10 into any of a plurality of screens.

FIGS. 4A and 4B are block diagrams of a functional configuration illustrating embodiments of the device input information processor of the present invention. In FIGS. 4A and 4B, a physical keyboard 16, a device control unit 48, a magnetic card reader 32 and a speaker 54 are provided on a keyboard base 46 arranged in a POS device unit 10. The device control unit 48 is composed of a DSP and special firmware. The physical keyboard 16 is connected to a first input port 48-1 of the device control unit 48, and a touch panel 20-2 which detects and outputs key operation of the screen keyboard comprising display of an LCD panel 20-1 of an LCD unit 20 is connected to a second input port 48-2. RS232C or the like is used as an interface connecting the first input port 48-1 to the second input port 48-2. A key data transfer control unit 50 is provided as a function to be achieved by execution of the program in the device control unit 48. The key data transfer control unit 50 monitors signal input from the physical keyboard 16 to the first input port 48-1 and input signal status from the touch panel 20-2 to the second input port 48-2. When an event caused by a key operation of a physical key or a screen key, the key data transfer control unit 50 transfers key data in a sequence of key operation from the input-output port 48-3 to the POS main body 12 via the keyboard cable 40. RS232C is used also as an interface between the device control unit and the POS main body 12 connected by the keyboard cable 40. The POS main body 12 corresponds to the main body of a personal computer, while the POS device unit 10 corresponds to the externally connected device equipment. The POS main body 12 has an OS of Windows (R) or the like, and a POS processing unit 60 executed as an application program. For the POS processing unit 60, there is provided a keyboard control unit 62 for communicating key data by key operation from the POS device unit 10. The keyboard control unit 62 notifies key data resulting from the operation of the physical key or the screen key, transferred by the key data transfer control unit 50 of the device control unit 48 to the POS processing unit 60 which is an application processing unit, carries out a processing in response to the key data, or more specifically, calculating amounts based on the numbers of pieces by extracting the unit prices from the name of goods, and summing up these amounts. The result of calculation performed in accordance with the key data by the POS processing unit 60 is transferred to the device control unit 48 of the POS device unit 10 via the keyboard control unit 62 to display an amount of money to the customer display 24.

In the present invention, the keyboard control unit 62 provided on the POS main body 12 fetches only key data upon key pressing from among the key data received from the key data transfer control unit 50 to notify the same to the POS processing unit 60 for execution of processing, and for the key data upon releasing the key, notification to the POS processing unit 60 is suppressed.

More specifically, the operation of the physical keys on the physical keyboard is such that output key data is transferred in synchronization with processing of a physical key, i.e., turn-on of the output key, and no output of key data takes place upon releasing of a screen key, i.e., upon turn-off of the output key. For the operation of the physical keys, therefore, the keyboard control unit 62 notifies the key data as it is, transferred upon pressing a key to the POS processing unit 60. On the other hand, for a signal from the touch panel 20-2 composing the screen keyboard, a make coordinate data is outputted upon pressing a screen key and transferred via the key data transfer control unit 50. Upon releasing the screen key, a break coordinate data is outputted and transferred via the key data transfer control unit 50. Therefore, the keyboard control unit 62 detects a make coordinate data transferred by pressing a screen key and notifies the same to the POS processing unit 60. On the other hand, for the break coordinate data notified by releasing the screen key, notification to the POS processing unit 60 is suppressed.

As viewed from the POS processing unit 60, therefore, for the operation of both the physical keys on the physical keyboard 16 and the screen keys on the screen keyboard 18 achieved through the display of the screen keys of the LCD panel 20-1 and the touch panel 20-2, only the key data upon pressing the key would be notified. Irrespective of whether the pressed key is a physical key or a screen key, the key data is notified to the POS processing unit 60 at the same timing of key pressing; processing is executed; the result of execution is returned; and a click sound is issued from, for example, the speaker 54. It is therefore possible to operate a physical key or a screen key at a uniform tempo. VGA drivers 66 and 68 and a mouse driver 70 are provided in the POS main body 12. The VGA driver 66 sends images of the individual screen keys which have been obtained by processing of the POS processing unit 60 and displayed as the screen keyboard to the LCD panel 20-1 provided in the LCD unit 20 of the POS driver unit 10 for display. The VGA driver 68 sends screen signals to the LCD panel 72 provided in the POS main body 12 in FIG. 1 to cause the LCD panel 72 to display the screen keyboard necessary for processing of the cash register as in the LCD panel 20-1 of the POS device unit 10. A touch panel 74 is provided in this LCD panel 72. The touch panel 74 is connected to the POS processing unit 60 via the mouse driver 70. For the key data from the touch panel 74 available when operating screen keys of the LCD panel 72, the mousse driver 70 notifies make coordinate data upon pressing the touch panel to the POS processing unit 60, and notifies break coordinate data to the POS processing unit 60 upon releasing the finger from the touch panel. For the notification from the mouse interface by the mouse driver 70, upon notification of the break coordinate data by releasing the finger from the screen key, the POS processing unit 60 executes processing based on the notified key data.

For the screen keyboard on the POS main body 12 side materialized by the LCD panel 72 and the touch panel 74, no physical keyboard is existent and there is only a screen keyboard as on the POS device unit 10 side. It is not therefore necessary to perform a special key data transfer control as in the case of the POS device unit 10, and key data are transferred by means of the conventional mouse interface. Control of key data output in a sequence of key operations of the physical keyboard 16 and the screen keyboard 18 by the key data transfer control unit 50 provided in the POS device unit 10 shown in FIGS. 4A and 4B will now be described in detail with reference to time charts shown in FIGS. 5A to 8C.

Figures 5A, 5B:
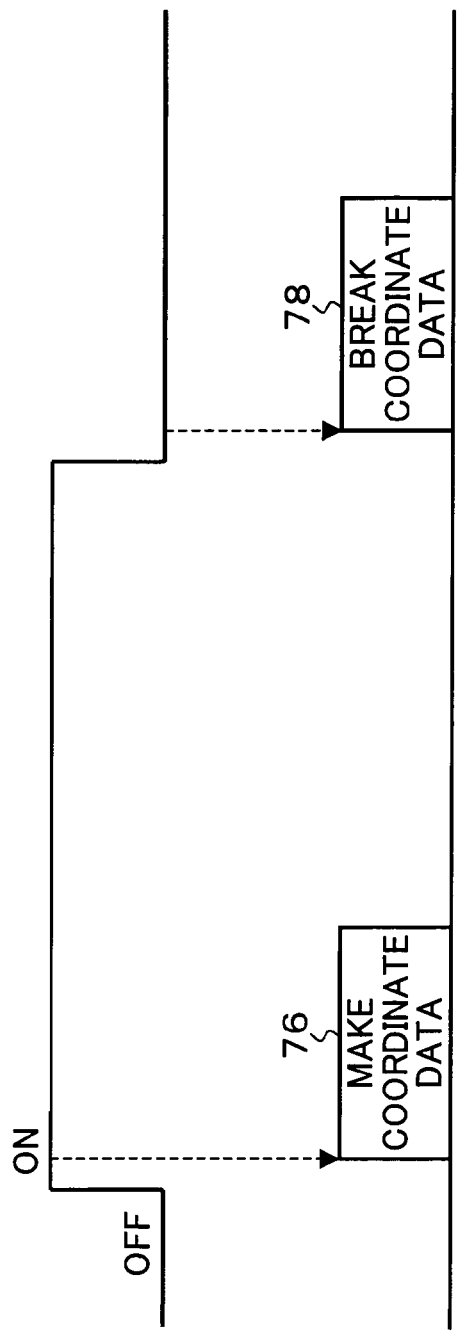
FIGS. 5A and 5B are time charts of the operation of a single screen key and transferred data.

FIGS. 5A and 5B are time charts of transferred data in a case where a screen key is operated in the screen keyboard. When pressing down a screen key as shown in FIG. 5A, and changing over the corresponding switch on the touch panel 20-2 from OFF to ON, the key data transfer control unit 50 transfers make coordinate data 76 to the POS main body 12 as shown in FIG. 5B.

Then, releasing the screen key causes the touch panel switch to change from ON to OFF, and at this point in time, the key data transfer control unit 50 transfers break coordinate data 78.

Figure 6A:
FIGS. 6A to 6C are time charts of transferred data when operating a screen key after a physical key.
Figure 6B:
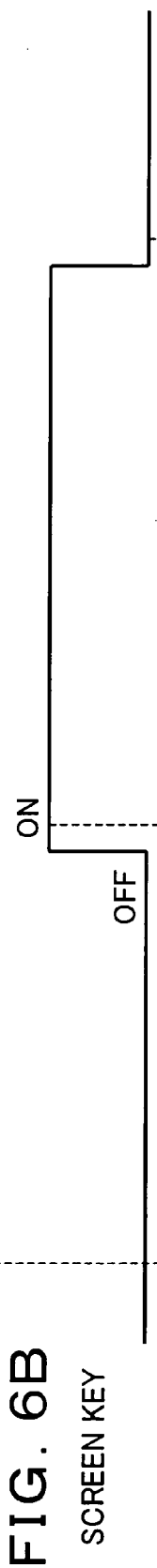
Figure 6C:
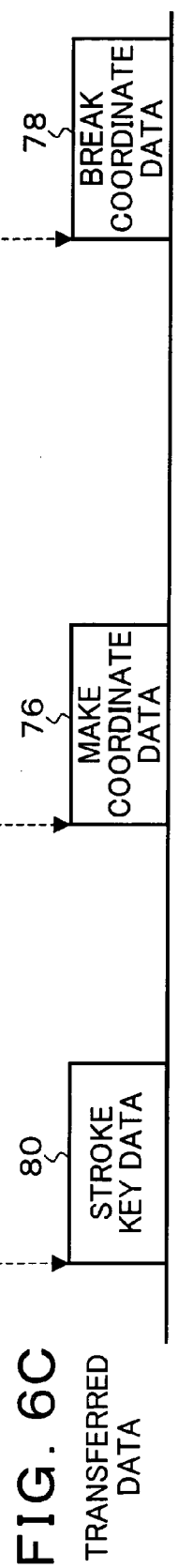

FIGS. 6A to 6C are time charts of transferred data upon operating a screen key after a physical key. When OFF is switched over to ON by pressing down a physical key as shown in FIG. 6A, a stroke data 80 is transferred as shown in FIG. 6C. In the ON-state of the physical key, a make coordinate data 76 is transferred through switching from OFF to ON by pressing down the screen key as shown in FIG. 6B. Then, ON is turned back to OFF by releasing the finger from the physical key. Since the output key data is transferred only upon pressing the physical key, key data transfer is not carried out at this point in time. When the screen key is subsequently released to return from ON to OFF, the break coordinate data 78 is transferred. By operating the physical key and the screen key as described above, and even when the screen key and the physical key are simultaneously turned on during a period, key data are transferred in the order of pressing the physical key and the screen key.

FIGS. 7A to 7C are time charts of transferred data in a case where the physical key is operated after the screen key in contrast to the case shown in FIGS. 6A to 6C. As shown in FIG. 7B, when pressing down the screen key to switch over the state of the key from OFF to ON, as shown in FIG. 7B, the make coordinate data 76 are transferred as shown in FIG. 7C. When the physical key is pressed down as shown in FIG. 7A in the middle of pressing the screen key, to switch over OFF to ON, transfer of the output data is suppressed since the screen key is in the process of being pressed. Then, when the screen key is released to change over ON to OFF, transfer of the break coordinate data is conducted. If the physical keys are in the turn-on state after the completion of transfer of the break coordinate data 78, transfer suppression of the key data is cancelled at this point in time, and stroke key data 80 are transferred. When keys are operated in the sequence from the screen keys to the physical keys, and even when a state of duplicated activation of the both keys during this operation, key data are transferred in accordance with the key operating sequence from the screen keys to the physical keys.

FIGS. 8A to 8C are time charts of transferred data in a case where a physical key is operated during a period from pressing to releasing of a screen key. When the turn-off state is switched over to the on-state by pressing down a screen key as shown in FIG. 8B, make coordinate data 76 are transferred as shown in FIG. 8C. When the OFF state is switched over to the ON state by pressing down a physical key as shown in FIG. 8A, and the key is then released to switch over from ON to OFF, transfer of output key data is suppressed upon pressing a physical key, since, upon pressing a physical key, a screen key is simultaneously pressed. When the screen key is released after releasing the physical key, the break coordinate data 78 are transferred. Upon the completion of transfer of the break coordinate data 78, transfer of the stroke key data is not performed, since the physical keys have already been deactivated. That is, even when pressing and releasing a physical key while pressing down a screen key, only the make coordinate data 76 and the break coordinate data 78 of the screen key are transferred, and the stroke key data of the physical key operated during this period are not transferred.

Figure 9A:
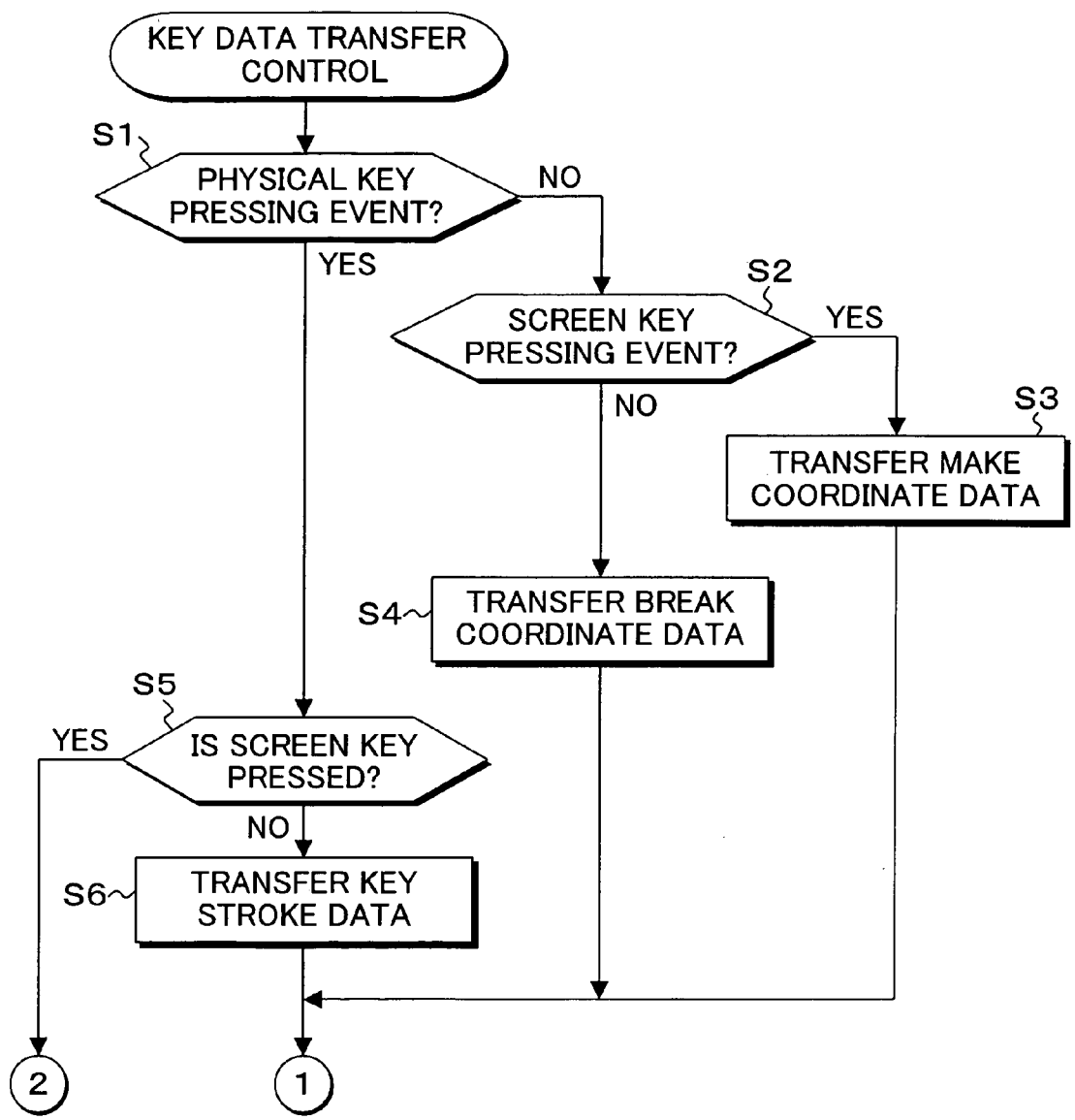
FIGS. 9A and 9B are flowcharts of key data transfer control of the present invention executed on the device unit side.
Figure 9B:
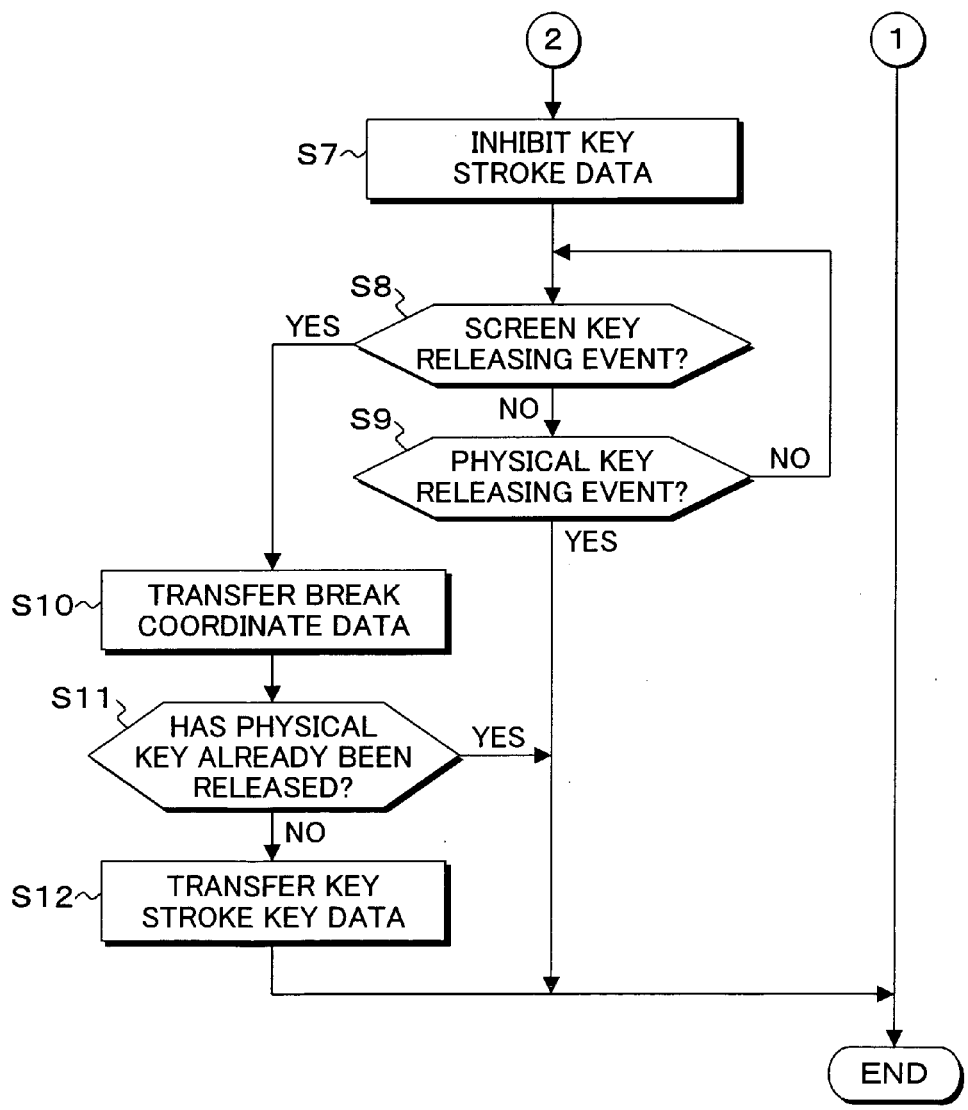

FIGS. 9A and 9B are flowcharts of key data transfer control executed by the key data transfer control unit 50 provided on the POS device unit 10 side shown in FIGS. 4A and 4B. The key data transfer control shown in FIG. 10 detects and executes an input event caused by a change in signal sent to the first input port 48-1 and the second input port 48-2 provided on the device control unit 48.

More specifically, when an input event is detected, it is checked whether or not it is a physical key pressing event in step S1. If it is not a physical key pressing event, the process advances to step S2, and it is checked whether or not it is a screen key pressing event. If it is a screen key pressing event, the make coordinate data are transferred in step S3. If it is not a screen key pressing event, it is a screen key releasing event. The process therefore proceeds to step S4 to transfer the break coordinate data. If the input event is determined to be a physical key pressing event in step S1, the process goes to step S5, and it is checked whether or not a screen key is in a pressed state. If the screen key is not in a pressed state, the process advances to step S6, and the key stroke data are transferred. When the screen key is in a pressed state in step S5, transfer of the key stroke data is suppressed in step S7, and thereafter, the screen key releasing event is monitored in step S8. When a screen key releasing event does not take place, the presence of a physical key releasing event is checked up. When a screen key releasing event is determined during the check cycles of steps S8 and S9, the break coordinate data are transferred in step S10, and then in step S11, it is checked whether or not the event is a physical key releasing event. If a physical key is inn the pressed state, the key stroke data are transferred in step S12. However, when the physical key has already been released in step S11, the pressing comes to an end without transferring the key stroke data. If a physical key releasing event is determined before determination of a screen key releasing event in the check cycles of steps S8 and S9, the processing comes to an end without transferring the key stroke data.

Such a key data transfer control makes it possible to transfer the key data in accordance with the sequence of key operations in response to the two key-operated input items from the physical and screen keyboards, and even upon rapid key operations in succession of physical keys of the physical keyboard and screen keys of the screen keyboard, reliably prevent a change in the sequence to the POS processing unit 60 which is an application, as has been experienced in the conventional art.

FIGS. 10A to 10D are time charts of a processing of preventing malfunction caused by transferred data received when the finger in touch with the screen keyboard coming off the key, under the effect of the keyboard control unit 62 provided on the POS main body 12 shown in FIG. 4B. It is assumed that the state is switched over from OFF to ON by bringing a finger into contact with a screen key and pressing the same as shown in FIG. 10A, and in this state, the finger is shifted sidewise, the neighboring screen key being pressed down for switching operation from ON to OFF as shown in FIG. 10B. The operation in which the finger in touch with the screen keyboard coming off presses the neighboring screen key occurs frequently when quickly operating the screen keyboard for input. In response to pressing of the first screen key shown in FIG. 10A, the make coordinate data 76 are transferred from the device control unit 48 as shown in FIG. 10C. Pressing of the neighboring screen key caused by the shift as shown in FIG. 9B switches OFF to ON. The screen key of FIG. 10A has already been turned on at this point in time. A control output from the touch panel is not therefore detected as an input event, and transfer of the make coordinate data does not result from pressing of the neighboring screen key.

Then, the screen key pressed first as shown in FIG. 10A is released. An input event is not therefore detected at this point in time since the neighboring key is in an on-state, and the break coordinate data are not transferred. Subsequently, the pressed neighboring key is released, causing switching of ON to OFF, and transfer of the break coordinate data 78 is accomplished.

In response to receiving of the transferred data shown in FIG. 10C resulting from the successive operation of the two screen keys upon shifting of the finger in touch with the screen keyboard as shown in FIGS. 10A and 10B as described above, the keyboard control unit 62 on the POS main body 12 side shown in FIGS. 4A and 4B notifies the make coordinate data 76-1 to the POS processing unit 60 as shown in FIG. 10D regarding only receiving of the make coordinate data 76-1 resulting from pressing of the screen key. For the break coordinate data 82, therefore, notification to the POS processing unit 60 is suppressed. As a result, even when the finger is shifted while being in contact with the screen keyboard, notification of the pressing event to the POS processing unit 60 occurs only once as to the screen key touched first. The other events are not notified to the POS processing unit 60 as an application. A malfunction caused by a releasing event upon releasing a shifted finger can be prevented without fail.

Figure 11:
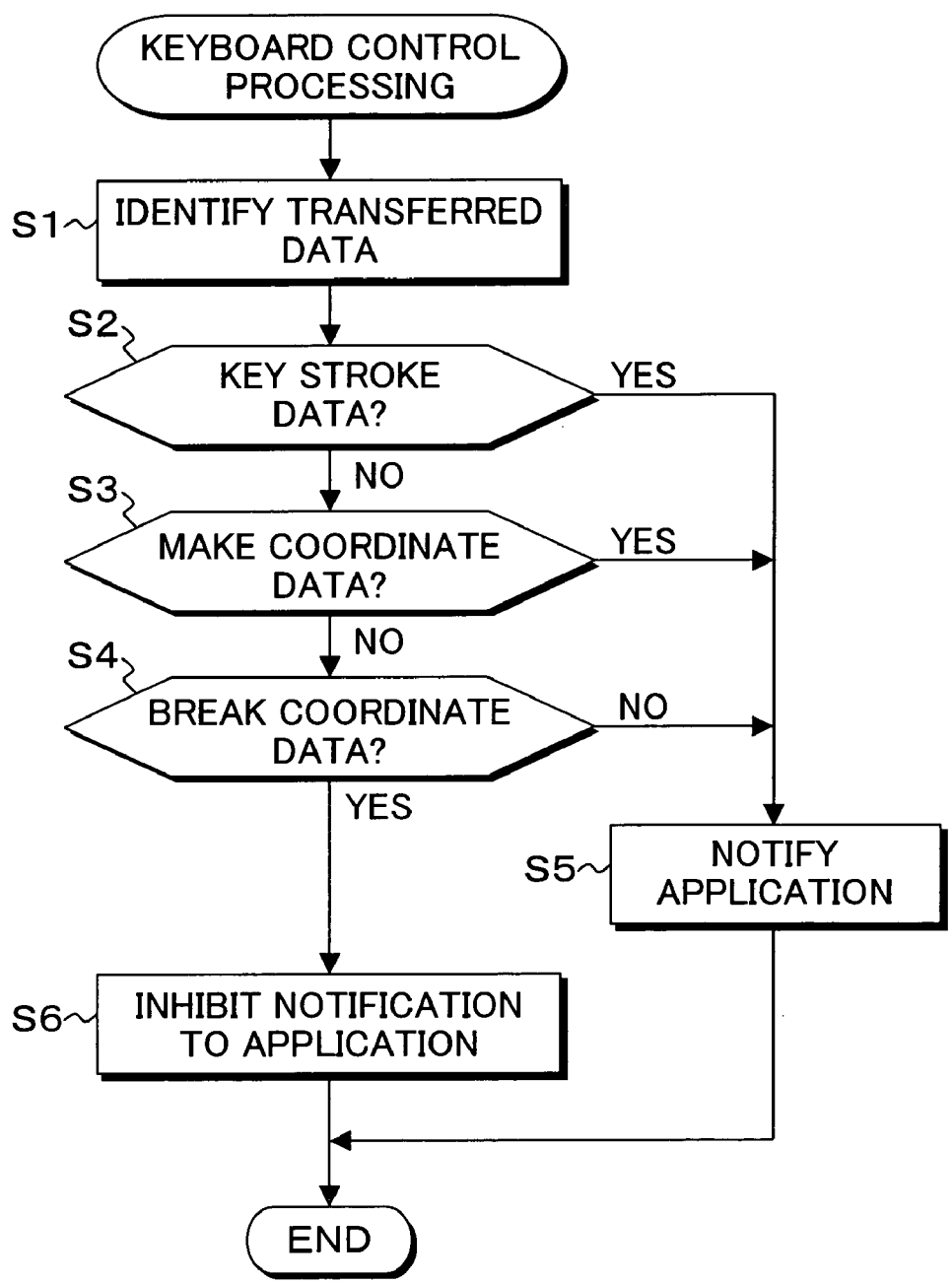
FIG. 11 is a time chart of keyboard control processing on the POS main body side for preventing a malfunction when the finger in touch with the screen keyboard comes off the position.

FIG. 11 is a flowchart of the keyboard control processing by the keyboard control unit 62 provided on the POS main body 12 side for preventing a malfunction caused by a shifted finger in touch with the screen keyboard. This keyboard control processing is executed for every receiving of data transferred from the POS device unit 10. The transferred data received in step S1 is first identified. When the transferred data is determined to be a key stroke data in step S2, the process advances to step S5 for notification to the application. When the data is identified as a make coordinate data in step S3, it is notified to the application in step S5. On the other hand, when the data is determined to be a break coordinate data in step S4, the process goes to step S6 to suppress notification to the application. For the purpose of preventing a malfunction caused by transferred data received upon shifting of the finger in touch with the screen keyboard as in FIGS. 10A to 10D and FIG. 11, the keyboard control unit 62 provided on the POS main body 12 side detects only a key-operated pressing event and notifies the same to the POS processing unit 60 serving as an application. This processing may be performed by means of the key data transfer control unit 50 of the POS device unit 10.

It suffices to carry out a key data transfer control in such a manner as to suppress transfer, to the POS main body 12, of the break coordinate data resulting from screen key releasing, for the make coordinate data resulting from pressing of a screen key and the break coordinate data resulting from releasing of a screen key from the touch panel 20-2 in the key data transfer control unit 50 provided in the device control unit 48.

Figure 12A:
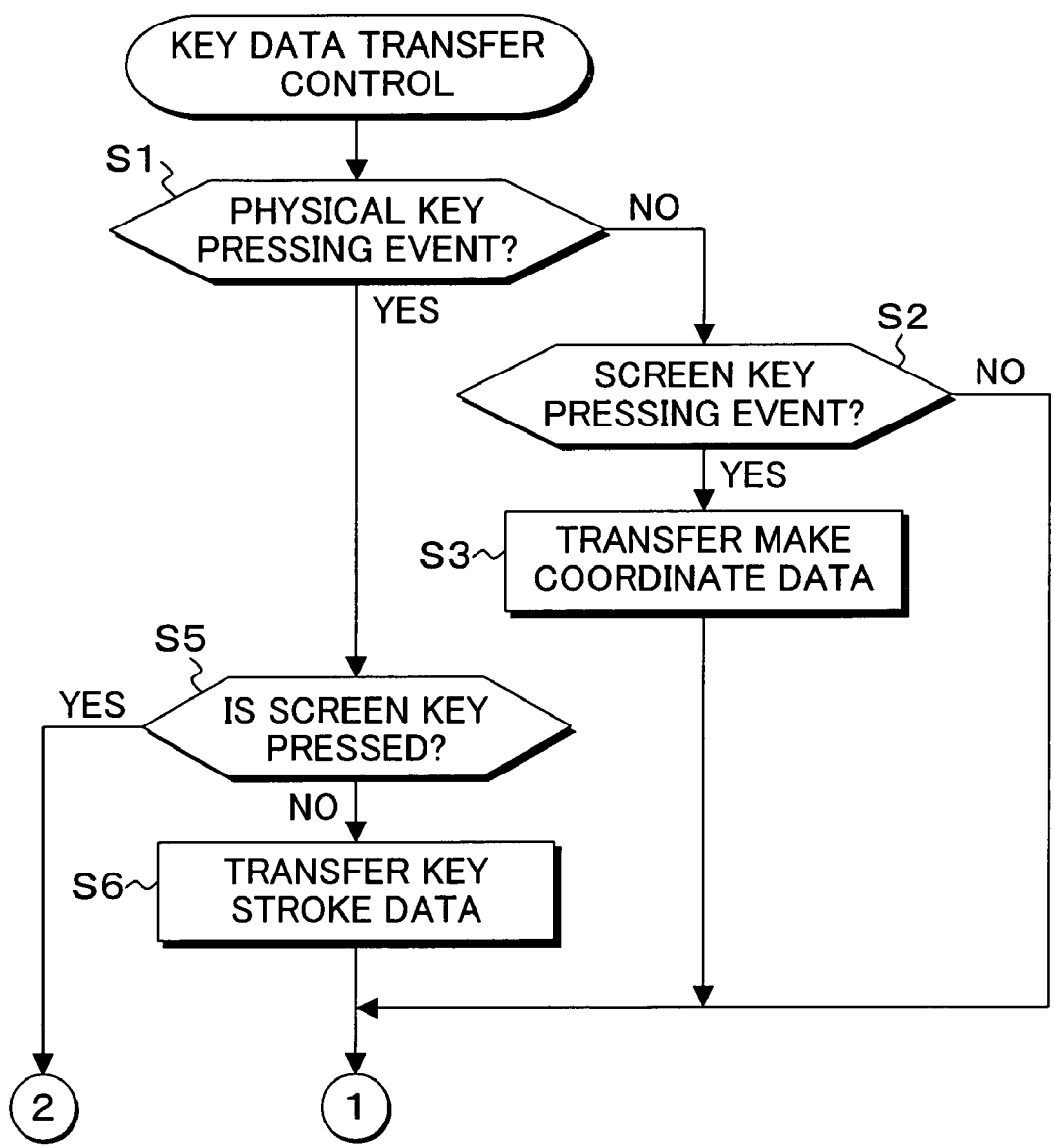
FIGS. 12A and 12B are flowcharts of data transfer control on the device unit for preventing a malfunction when the finger in contact with the screen keyboard.
Figure 12B:
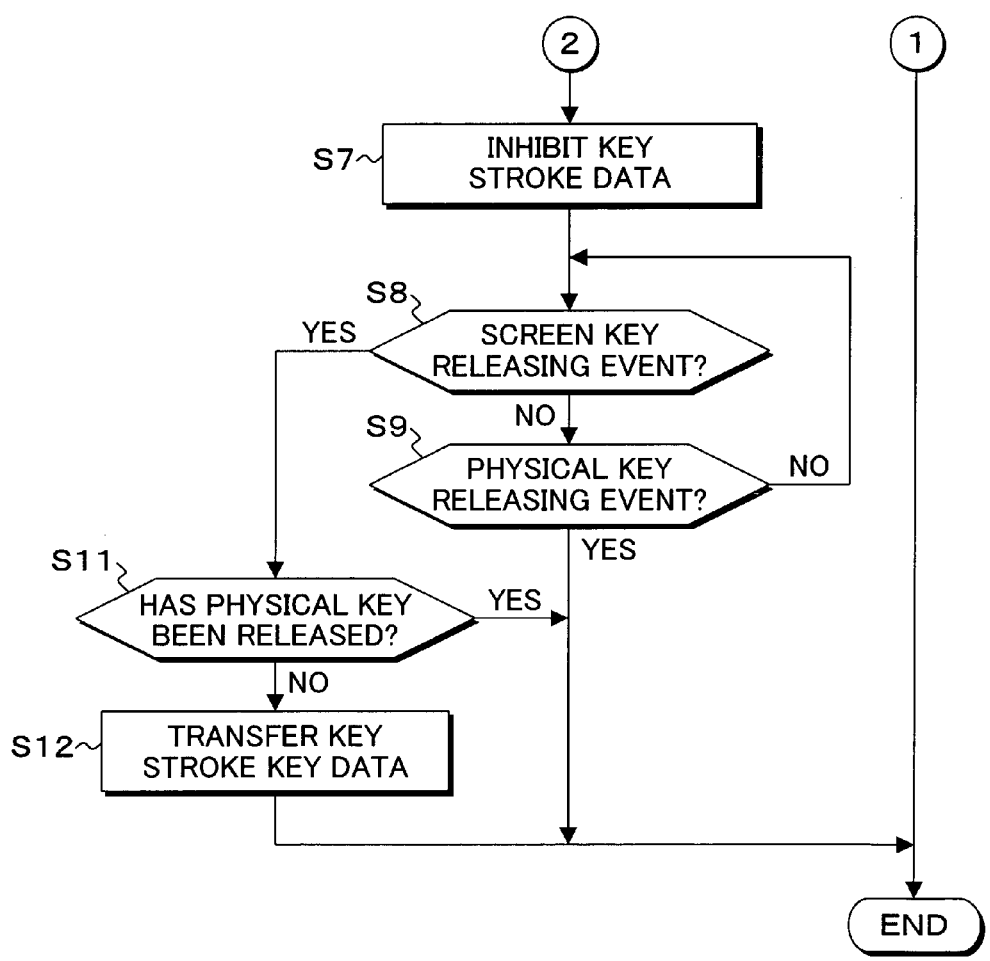

FIGS. 12A and 12B are flowcharts of key data transfer control carried out on the POS device unit 10 side so as to suppress the transfer of break coordinate data available upon releasing the screen key. The key data transfer control is the key data transfer control as shown in FIGS. 9A and 9B, except for the processes in steps S4 and S10 of transferring the break coordinate data. For the other steps S1 to S3, S5 to S9, S11 and S12, the operations are the same as in the control processing shown in FIGS. 8A to 8C.

The present invention provides also a program for materializing functions of the key data transfer control unit 50 executed at the device control unit 48 received by a DSB or firmware provided in the POS device unit 10. The program for this purpose complies with the flowchart of key data transfer control shown in FIG. 10. When transferring only key data of the screen key pressing event, and suppressing transfer of key data of the screen key releasing event, the program complies with the flowchart of key data transfer control shown in FIG. 13.

The above-mentioned embodiment has covered the case of input information processing in the POS system. The present invention is not however limited to this, but applicable also as it is to a device unit in which a physical keyboard and a screen keyboard are arranged adjacent each other and both keyboards are operated in close succession.

The present invention includes appropriate variants without impairing the object and advantages and is not restricted by the numerals shown in the above-mentioned embodiment.

According to the present invention, as described above, even when physical keys and screen keys are operated in succession on a physical keyboard and a screen keyboard arranged adjacent each other, key data are transferred in the sequence of key operations without fail for notification to the application. Even when keys are quickly operated on the physical and screen keyboards, it is possible to reliably prevent a change in notification sequence to the application.

Only key data upon pressing keys on the physical keyboard and the screen keyboard are notified to the application for processing based on the key data. Upon bringing a finger into touch with the key and upon releasing the key, a malfunction caused when the finger in touch with the key comes off the key can therefore be reliably prevented, and it is thus possible to assure operation of the keyboards without malfunction.

For each of the physical keyboard and the screen keyboard, pressing of a key activates the application, and for example, a clock sound can be made from the speaker. It is therefore possible to carry out operation at a uniform tempo even when successively operating the physical keyboard and the screen keyboard, and efficiently operate the keys without a change in tempo even when operating two different keyboards including the physical and screen keyboards.

What is claimed is:

1. An input information processing apparatus comprising:
   a physical keyboard which has a plurality of physical keys and generates key data through operation of said physical keys;
   a screen keyboard which comprises a plurality of screen keys arranged and displayed on a screen having a touch panel arranged thereon, and generates key data through operation of said screen keys;
   an input port to which said physical keyboard and said screen keyboard are connected;
   an output port for transferring said key data;
   an application processing unit which performs prescribed processing in accordance with said transferred key data;
   a key data transfer control unit which transfers the key data entered from said input port through key operation on said physical keyboard and the key data from said input port through operation on said screen keyboard in accordance with an operating sequence for these keyboards via said output port; and
   a keyboard control unit which notifies said application processing unit of said key data transferred from said key data transfer control unit for causing to execute processing.

2. The input information processing apparatus according to claim 1, wherein said key data transfer control unit:
   transfers key stroke data for each processing stroke of the physical key when said physical keys are operated in succession; and
   transfers make coordinate data for each pressing stroke of the screen key, and transfers break coordinate data for each releasing stroke of the screen key when said screen keys are operated in succession.

3. The input information processing apparatus according to claim 1, wherein, when successively operating the physical keys and then the screen keys in duplication, said key data transfer control unit transfers key stroke data upon pressing a physical key, then transfers make coordinate data upon pressing a screen key, and then transfers break coordinate data upon releasing the screen key.

4. The input information processing apparatus according to claim 1, wherein, when successively operating the screen keys and then the physical keys in duplication, said key data transfer unit transfers make coordinate data upon pressing a screen key, suppresses transfer of key stroke data upon pressing a physical key while pressing a screen key, transfers break coordinate data upon releasing the screen key, and when pressing of the physical key is continued after releasing the screen key, transfers key stroke data in succession to the transfer of said break coordinate data.

5. The input information processing apparatus according to claim 1, wherein said key data transfer unit transfers, when operating a physical key during operation of a screen key, make coordinate data upon pressing the screen key, suppresses transfer of key stroke data upon pressing the physical key during pressing of the screen key, and transfers break coordinate data upon releasing the screen key.

6. The input information processing apparatus according to claim 1, wherein said keyboard control unit notifies the key data upon pressing the key from among the key data received from said key data transfer unit to the application processing unit for execution of processing, and suppresses notification of the key data upon releasing the key.

7. The input information processing apparatus according to claim 6, wherein said keyboard control unit notifies the make coordinate data upon pressing the screen key from among the key data received from said key data transfer unit to the application processing unit to cause execution of the processing, and suppresses notification of the break coordinate data upon releasing the screen key.

8. The input information processing apparatus according to claim 1, wherein said key data transfer control unit transfers key data upon pressing a key in response to key operation, and suppresses transfer of key data upon releasing the key.

9. The input information processing apparatus according to claim 8, wherein said key data transfer control unit transfers make coordinate data upon pressing a screen key in response to key operation, and suppresses transfer of break coordinate data upon releasing the screen key.

10. The input information processing apparatus according to claim 1, wherein said physical keyboard, said screen keyboard and said key device transfer control unit are provided in the POS device unit, together with a scanner unit which reads product barcode, and said keyboard control unit and said application processing unit are provided in a POS main body having a card register.

11. An input information processing method comprising:
a first event detecting step of detecting an event caused by operation of a physical key from the signal status of an input port connected to a physical keyboard which has a plurality of physical keys and generating key data through key operation to said physical keys;
a second event detecting step of detecting an event caused by operation of a screen key from the signal status of the input port connected to the screen keyboard which displays a plurality of screen keys on a screen comprising a touch panel and generating key data through key operation to said screen keys; and
a key data transfer controlling step of transferring key data entered from said input port through key operation on said physical keyboard and key data entered from said input port through key operation on said screen keyboard in accordance with an operating sequence for the both keyboards via an output port.

12. The input information processing method according to claim 11, further comprising a keyboard controlling step of notifying key data transferred in said key data transfer controlling step for execution.

13. The input information processing method according to claim 12, wherein said keyboard controlling step is to notify key data upon pressing the key from among the key data transferred in said key data step to the application for execution, and suppress notification of the key data upon releasing the key.

14. The input information processing method according to claim 11, wherein said key data transfer controlling step is to transfer the key data upon detecting a key pressing event for a key operation, and suppress key data transfer upon detecting a key releasing event.

15. A program stored on a computer readable medium, the program causing a computer composing a device control unit to execute: a computer composing a device control unit to execute:
a first event detecting step of detecting an event caused by operation of a physical key from the signal status of an input port connected to a physical keyboard which has a plurality of physical keys and generating key data through key operation to said physical keys;
a second event detecting step of detecting an event caused by operation of a screen key from the signal status of the input port connected to the screen keyboard which displays a plurality of screen keys on a screen comprising a touch panel and generating key data through key operation to said screen keys; and
a key data transfer controlling step of transferring key data entered from said input port through key operation on said physical keyboard and key data entered from said input port through key operation on said screen keyboard in accordance with an operating sequence for the both keyboards via an output port.

16. A program according to claim 15, wherein said key data transfer controlling step is to transfer the key data upon detecting a key pressing event for a key operation, and suppress key data transfer upon detecting a key releasing event.

* * * * *